INVENTORS
ROBERT D. PEARSON
ALBERT E. BOIE
BY *Robert H. Ware*
ATTORNEY

INVENTORS
ROBERT D. PEARSON
ALBERT E. BOIE
BY *Robert H. Ware*
ATTORNEY

3,367,676
FOLDING CARTS
Robert D. Pearson, Mountain View Drive, Brookfield, Conn. 06804, and Albert E. Boie, Timber Top Trail, Wilton, Conn. 06897
Filed Mar. 15, 1966, Ser. No. 534,526
7 Claims. (Cl. 280—36)

ABSTRACT OF THE DISCLOSURE

A folding cart having two wheels on an axle pivotally joined to a collapsible tubular aluminum frame, pivotally erectable to form triangular truss side frames supporting a rectangular top frame from which a fabric cargo sling peripherally depends.

Background of the invention

This invention relates to lightweight folding carts for use as garden carts, factory or warehouse tote carts, beach, grocery or laundry carts, or carts for many other industrial, commercial and personal uses.

Conventional rolling carts are either of heavily built non-folding types, requiring a large volume of storage space when not in use, or fragile, collapsible types with strictly limited load capacity.

Summary of the invention

The sturdy, rugged carts of the present invention are conveniently foldable into a small, flat space for storage, while affording ample carrying capacity and heavy duty construction for carrying heavy loads.

Accordingly, a principal object of the present invention is to provide a sturdy folding cart with ample load-carrying capacity which is capable of being folded conveniently and quickly into a small flat volume of space for storage.

Other and more specific objects will be apparent from the features, elements, combinations and operating procedures disclosed in the following detailed description and shown in the drawings, in which.

The folding carts of the present invention are extremely sturdy, while being unusually light in weight. Like tubular aluminum garden furniture, they are preferably formed of heavy aluminum tubing, bent and secured in the pivoting configuration shown in the figures. The design of these pivoting tubular frame members allows the carrying carts of this invention to be folded substantially flat, as shown in FIGURE 2, for hanging or flat storage, and to be erected quickly and conveniently into the erect condition shown in FIGURE 1.

Figure 1:
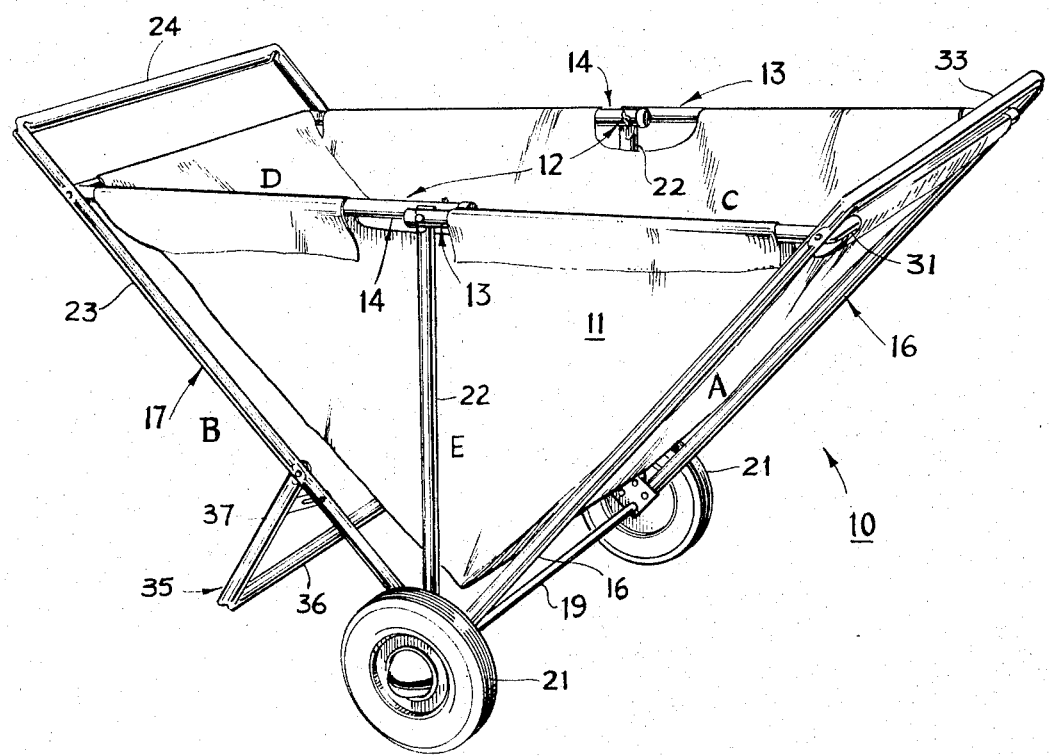
FIGURE 1 is a perspective side elevation view of a folding cart of the present invention.

For maximum convenience in folding and unfolding and accomodating irregular-shaped loads, the carts 10 of this invention are provided with a hammock or bag-shaped fabric sling 11 shown in FIGURE 1 and omitted from the other figures for clarity. Sling 11 extends downward from a rolled-over, seamed upper edge which is supported by a two-part sling frame 12 encircling the top of the sling 11 (FIGURE 1). Sling frame 12 incorporates a forward U member 13 and a rear U member 14 having free ends pivotally joined together, with their base corners pivotally secured to a folding support frame. Forward U member 13 comprises two parallel side arms 29 joined by a cross member 31. Rear U member 14 comprises two parallel side arms 27 joined by a cross member 26. These U members may be substantially square-cornered to produce an erected rectangular sling frame 12, as shown in the drawings, or they may be formed in more gently curved configurations to provide sling frames of different shapes upon erection.

Figure 2:
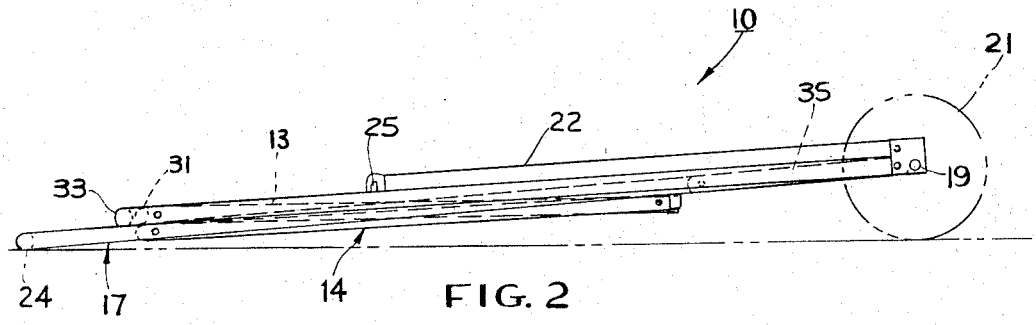
FIGURE 2 is a side elevation view of the cart in its folded, collapsed condition.
Figure 4:
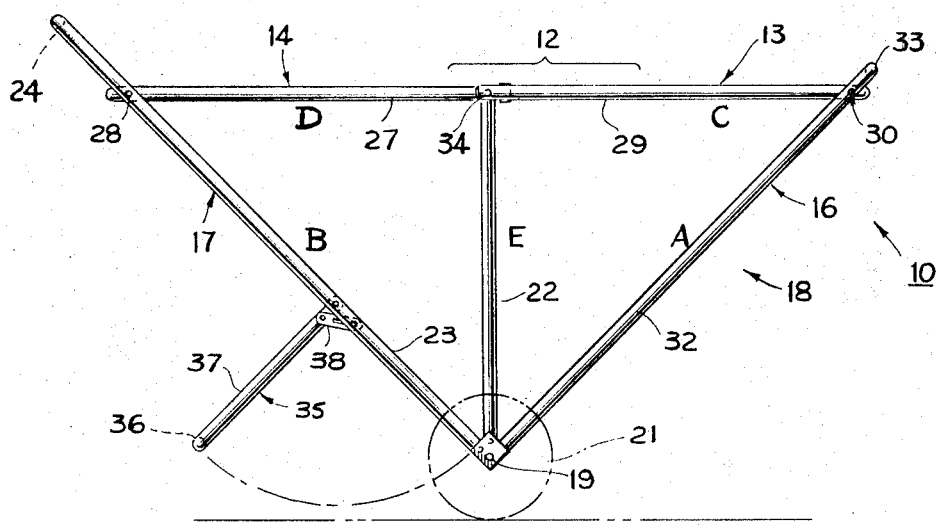
FIGURE 4 is a side elevation view of the erected cart framework.

The supporting frame which is erectable to support and spread the U members into their substantially co-planar erect condition includes a forward frame member 16 and a rear frame member 17, both of which may be substantially U-shaped like the two members of the sling frame 12, but with slightly longer side legs as shown in FIGURES 2 and 4. Forward frame member 16 comprises two parallel side legs 32 joined by a cross member 33. Rear frame member 17 comprises two parallel side legs 23 joined by a cross member 24. The free ends of the legs 32 and 23 of frame members 16 and 17 are pivotally joined beneath sling frame 12 to allow these two frame members 16 and 17 to fold together and pivot apart to form a V-shaped supporting frame 18 underlying the sling frame 12. Frame members 16 and 17 are preferably pivotally joined on or near the axis of a wheel shaft 19, having a wheel 21 mounted at each exposed outer end.

The collapsible carts of this invention are maintained in their erected condition shown in FIGURES 1 and 4 by two anchor braces 22, positioned one on each side of the assembled frame and having their lower ends pivotally joined thereto on or near the axis of shaft 19, while their upper ends are provided with notches 25 as shown in FIGURE 2 for engagement with the connector pivotally joining the free ends of the arms 29 and 27 of the forward and rear U members 13 and 14 forming the sling frame 12.

As indicated in the drawings, the opposite free ends of side arms 27 and 29 on each side of the collapsible cart 10 are juxtaposed and pivotally joined by such means as bolt and wing nut assemblies 34. By loosening the wing nuts, the notched upper end of each anchor brace 22 may be slipped off to permit folding of the cart 10, and when each anchor brace 22 has its notched end engaged with the bolt, the tightening of the wing nuts secures the anchor brace 22 in a position supporting the U members 13 and 14 in substantially co-planar relationship to form a generally rectangular sling frame 12.

After disengaging the notched anchor brace 22 from this pivot pin joining the sling frame U members at each side of the erected cart, the anchor braces 22 and the frame members may all be pivoted about shaft 19 toward each other from the position shown in FIGURES 1 and 4 to the position shown in FIGURE 2, automatically bringing the forward and rear U members 13 and 14 of the sling frame 12 into an articulating, pivoting folded position, moving them from the flat co-planar position shown in FIGURES 1 and 4 to the folded-over position shown in FIGURE 2.

The side legs 23 of the rear frame member 17 may be made slightly longer than the corresponding side legs 32 of the forward frame member 16; thus the cross member 24 joining the side legs 23 of rear frame member 17 may be spaced away from the corresponding cross member 26 (FIGURE 3) joining the side arms 27 of the rear U member 14. With this spaced-apart relationship of the cross members 24 and 26, the folded-flat cart of FIGURE 2 may be hung by its cross member 24 over a wall hook. In the unfolded, erect condition shown in FIGURES 1 and 4, the cross member 24 forms a convenient handle for moving the erected cart 10 as it rolls on wheels 21.

Figure 3:
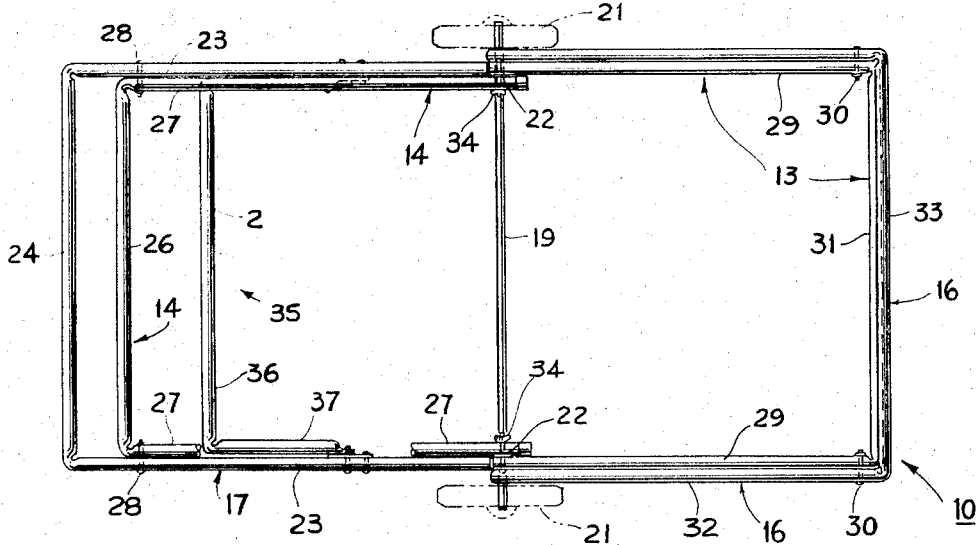
FIGURE 3 is a top plan view of the cart framework in the erected condition of FIGURE 1.

As shown in FIGURE 3, the side legs 23 of rear frame member 17 extend close beside the corresponding side arms 27 of the rear U member 14. Pivot pins 28 pivotally join the bases of side arms 27 near their cross member 26 to corresponding points on side legs 23, near but spaced away from their cross member 24, to position this cross member in the upwardly-spaced handle position shown in FIGURES 1 and 4.

Similar pivoting connectors or pivot pins 30 join the adjacent side members of the forward U member 13 and the forward frame member 16 at their super-imposed corners, near their cross members 31 and 33. The pivot pins 30 are spaced slightly further from cross member 33 than from cross member 31 to allow these two members to be pivoted about the pivot pins 30 into a closely juxtaposed relationship, when the side legs 32 are pivoted to lie beside the side arms 29 as indicated in FIGURE 2.

As indicated in the drawings, the side legs 23 and 32 of the forward and rear frame members 16 and 17 may be pivotally joined by pivot pins secured in side plates at points close to the axis of wheel shaft 19 to provide the flat-folding capability of the carts of this invention.

A generally U-shaped kick stand 35 may be formed with a cross member 36 joining two substantially perpendicular side legs 37 extending parallel to each other with their free ends pivotally joined at a suitable intermediate point to the side legs 23 of the rear frame member 17. A short elongated stop member 38 may have one of its ends pivotally joined to side leg 37 close to the side leg 23, with the opposite end of stop member 35 having an elongated slot engaging a rivet on leg 23 positioned between this pivot point and the wheel shaft 19. The length of the slot in stop member 38 determines the pivotal arc through which the kick stand 35 may swing; as indicated in FIGURE 4, this arc should be ninety degrees or slightly more to allow the erected cart 10 to be lowered gently, about the axis of wheel shaft 19 when it stands upon its wheels 21, until part of its weight rests upon and is transmitted to the ground by kick stand 35.

As indicated in FIGURE 4, arm 29, anchor brace 22 and leg 32 form a sturdy triangle, and arm 27, brace 22 and leg 23 form a second sturdy triangle, when brace 22 is locked by bolt-wing nut assembly 34. These two triangles combine to form a load-carrying truss, but when the operator loosens assembly 34 and disengages the notched brace 22, this entire truss folds flat to form the easily stored structure shown in FIGURE 2.

In the erected side elevation view in FIGURE 4, it will be noted that the front and rear frames between their pivoting axes 19, 30 and 28 form the longer diagonal sides A and B of structural triangles ACE and BDE, in which the shorter upper sides C and D are formed by the front and rear U members 13 and 14 while the common side E is formed by anchor brace 22.

If the shorter sides C, D and E of the two triangles are substantially equal and if A and B are about 1.414 times as long as C, D or E, as shown in the drawings, the resulting structural truss comprises two "45-degree" triangles, and U members 13 and 14 form a substantially co-planar sling frame 12 for the rim of the fabric sling 11. Thus, as indicated in FIGURE 1, the cart frame comprises two such double-triangle trusses spaced apart to enclose the sling 11 suspended above the level of wheel shaft 19.

While the sling 11 has been omitted from FIGURES 2, 3 and 4, it collapses and folds conveniently if made from conventional fabrics such as canvas or woven plastic materials selected to provide the requisite strength. An additional advantage may be secured by forming top-opening pockets on the outer side or rear faces of the sling 11 to accommodate wrenches, garden tools, pads of accounting forms such as bills of lading, or other small tools or articles commonly used by the operators of the folding carts of this invention in conjunction with the objects or loads carried by these carts.

While the objects of the invention are efficiently achieved by the preferred forms of the invention described in the foregoing specification, the invention also includes changes and variations falling within and between the definitions of the following claims.

We claim:
1. A folding cart comprising in combination:
(A) wheel means secured to a wheel shaft and providing rolling support for the cart,
(B) a forward frame and a rear frame pivotally joined together at a first axis near the wheel shaft, and secured by a connecting means to the wheel shaft,
(C) an articulated folding support frame including
(1) a rigid forward U member having a closed end pivotally joined to the forward frame at a second axis remotely spaced a distance A from the first axis and a rearwardly-facing open end extending a distance C from the second axis, and
(2) a rigid rear U member having a closed end pivotally joined to the rear frame at a third axis remotely spaced a distance B from the first axis and a forwardly-facing open end extending a distance D from the third axis,
(3) with the open ends of both U members being pivotally joined together by a bolt means at a fourth axis, all four axes being parallel,
(D) and disengageable means connected to maintain both U members in an erected load carrying condition, including substantially vertically positionable anchor brace pivotally joined to the forward frame and the rear frame near the wheel shaft and disengageably connectable to the support frame near the fourth axis at a distance E from the wheel shaft axis disengageably joining the wheel shaft to the open ends of both U members, forming when engaged therewith in a substantially vertical plane
(1) a first rigid triangular sub-frame having a side portion of the rear U member as a substantially horizontal top bar and a side portion of the rear frame as a rigid rear diagonal bar, and
(2) a second rigid triangular sub-frame having a side portion of the forward U member as a substantially horizontal top bar and a side portion of the forward frame as a rigid front diagonal bar,
(3) with both triangular sub-frames together forming a load-carrying rigid truss securing the support frame in a substantially horizontal load-bearing position while transmitting the weight of all loads carried thereon to the wheel shaft,
(E) the anchor brace being provided with a notch disengageably receiving said bolt means pivotally joining the members at the fourth axis.

2. The folding cart defined in claim 1 wherein the distances A and B are substantially equal.

3. The folding cart defined in claim 1 wherein the distances C and D are substantially equal.

4. The folding cart defined in claim 1 wherein the distances A and B are substantially equal, and the distances C and D are substantially equal and less than the distance A or B, whereby relative pivotal folding movement of the forward and rear frame members about the first axis produces articulating relative folding movement of the U members about the other axes to bring both frames and both U members into closely folded juxtaposition.

5. The folding cart defined in claim 1 wherein the distances C, D and E are all substantially equal.

6. The folding cart defined in claim 5 wherein the distances A and B are both substantially 1.4 times as long as the distance C, D or E.

7. The combination defined in claim 1 wherein a foldable cargo carrying sling depends from the support frame.

References Cited

UNITED STATES PATENTS

| 2,393,149 | 1/1946 | Cunningham et al. | 280—36 |
| 2,431,834 | 12/1947 | Sinclair | 280—36 |
| 2,789,829 | 4/1957 | Parker | 280—36 |
| 2,938,748 | 5/1960 | Johnson | 280—36 |

BENJAMIN HERSH, *Primary Examiner.*

L. D. MORRIS, *Examiner.*